(12) United States Patent
Asada

(10) Patent No.: US 6,456,413 B1
(45) Date of Patent: Sep. 24, 2002

(54) PLANAR TYPE OPTICAL SCANNING APPARATUS AND MOUNTING STRUCTURE THEREOF

(75) Inventor: Norihiro Asada, Urawa (JP)

(73) Assignee: The Nippon Signal Co., Ltd., Tokyo (JP)

( * ) Notice: Subject to any disclaimer, the term of this patent is extended or adjusted under 35 U.S.C. 154(b) by 0 days.

(21) Appl. No.: 09/673,269

(22) PCT Filed: Feb. 25, 2000

(86) PCT No.: PCT/JP00/01132

§ 371 (c)(1),
(2), (4) Date: Oct. 13, 2000

(87) PCT Pub. No.: WO00/50950

PCT Pub. Date: Aug. 31, 2000

(30) Foreign Application Priority Data

Feb. 26, 1999 (JP) ............................................. 11-51805

(51) Int. Cl.[7] ............................................. G02B 26/08
(52) U.S. Cl. ..................... 359/199; 359/198; 359/212; 359/223
(58) Field of Search ................................. 359/198, 199, 359/846, 848, 223, 224, 212; 310/36

(56) References Cited

U.S. PATENT DOCUMENTS 4,421,381 A   12/1983  Ueda et al.
5,629,790 A * 5/1997  Neukermans et al. ........ 359/198
5,748,172 A   5/1998  Song et al. .................. 345/111

FOREIGN PATENT DOCUMENTS

| JP | 60-107017 | 6/1985 |
| JP | 4-211218 | 8/1992 |
| JP | 7-175005 | 7/1995 |
| JP | 7-218857 | 8/1995 |
| JP | 8-322227 | 12/1996 |
| JP | 11-231252 | 8/1999 |

* cited by examiner

Primary Examiner—James Phan
(74) Attorney, Agent, or Firm—Finnegan, Henderson, Farabow, Garrett & Dunner, L.L.P.

(57) ABSTRACT

The present invention relates to a planar type optical scanning apparatus and a mounting structure thereof, which enables further miniaturization and cost reduction. By locating a mirror (14), on the surface side of a movable plate (12) that is axially supported by torsion bars (13A, 13B) on a silicon substrate (11), and a drive coil (15) on the rear side thereof, the area of the movable plate (12) can be reduced. Furthermore, in an optical scanning apparatus fixing region on a package substrate (31), a cavity (32) and conductive patterns (33, 33A, 33B) are provided, the construction being such that the electrode terminals (16A, 16B) of the drive coil provided on the rear face of the silicon substrate (11) of the optical scanning apparatus (10) are connected with the conductive patterns (33, 33A, 33B) to mount the optical scanning apparatus (10) on the package substrate (31).

5 Claims, 10 Drawing Sheets

PLANAR TYPE OPTICAL SCANNING APPARATUS AND MOUNTING STRUCTURE THEREOF

TECHNICAL FIELD

The present invention relates to a planar type optical scanning apparatus that is manufactured using semiconductor manufacturing technology, and in particular to a technique for miniaturizing and reducing the cost of planar type optical scanning apparatus.

BACKGROUND ART

The present inventor has previously proposed a very small size planar type optical scanning apparatus which is manufactured by micro machining technology in which semiconductor manufacturing technology is applied, for example a planar type mirror galvanometer (refer to Japanese Unexamined Patent Publication Nos. 7-175005, 7-218857 and 8-322227).

A description of the principle of operation of this planar type optical scanning apparatus is given below.

The planar type optical scanning apparatus comprises a silicon substrate on which is integrally formed a planar movable portion, and an axial support portion of a torsion bar construction, for axially supporting the movable portion so as to be able to swing in a central location of the movable portion, relative to the silicon substrate. A mirror is provided in the center of the movable portion, and a drive coil of thin copper film, for generating a magnetic field by means of a current, is provided at the periphery thereof. Moreover, static magnetic field generating devices, such as pairs of permanent magnets, are provided at the periphery of the movable portion so that the resultant static magnetic fields act on the drive coil portion located on opposite sides of the movable portion, those opposite sides being parallel to the axial direction of the axial support portion. With the above-mentioned patent applications, pairs of permanent magnets are respectively located above and below the opposite side portions of the movable portion, the construction being such that the static magnetic fields generated between the pairs of permanent magnets intersect the drive coil in predetermined directions.

The optical scanning apparatus with such a construction drives the movable portion by the interaction of a magnetic field generated by passing a current through the drive coil, and a static magnetic field generated by the static magnetic field generating devices.

That is to say, a static magnetic field is formed by means of the permanent magnets on opposite sides of the movable portion, in a direction so as to intersect the drive coil along the planar face of the movable portion. When a current flows in the drive coil positioned in this static magnetic field, a magnetic force acts in a direction according to Fleming's left hand rule for current, magnetic flux density and force, on the opposite sides of the movable portion in proportion to the current density and magnetic flux density of the drive coil, as represented by the following equation (1), so that the movable portion is rotated.

$$F = i \times B \qquad (1)$$

where F is the magnetic force, i is the current flowing in the drive coil, and B is the magnetic flux density.

The axial support portion is twisted with the rotation of the movable portion, producing a spring reaction force, so that the movable portion rotates to a position where the magnetic force and the spring reaction force are in equilibrium. The angle of rotation of the movable portion is proportional to the current flowing in the drive coil, and hence the rotation angle of the movable portion can be controlled by controlling the current flowing in the drive coil. Consequently, the direction of reflection of light, such as a laser beam incident on the mirror in a plane perpendicular to the axis of the axial support portion, can be freely controlled. Hence scanning of light such as laser scanning is possible by cyclical operation to continuously change the mirror displacement angle.

Since this optical scanning apparatus is produced using single crystal silicon, which is light, strong, and capable of being batch processed, mass production with consistent quality is possible.

In the case where a large number of chips are produced by batch processing of semiconductor wafers, the cost of one wafer is the same wherever the same process is used. Consequently, if the number of chips that can be produced on one wafer is increased, in other words if the chips are further miniaturized, the cost is reduced accordingly.

Figure 10A:
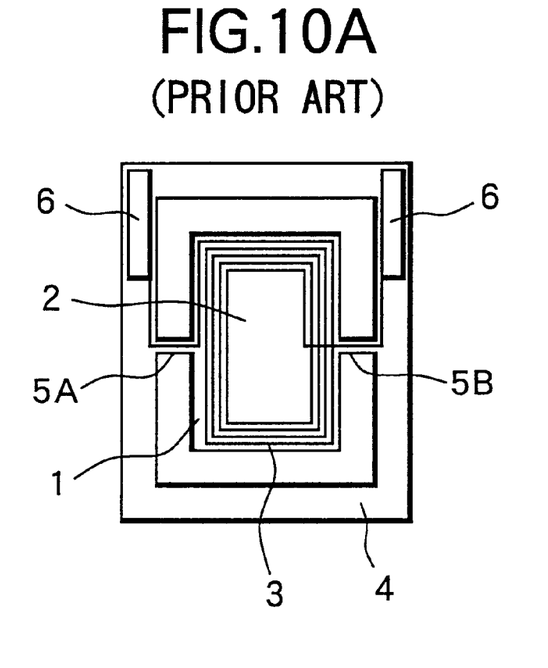
FIG. 10(A) shows the surface side of a conventional optical scanning apparatus.
Figure 10B:
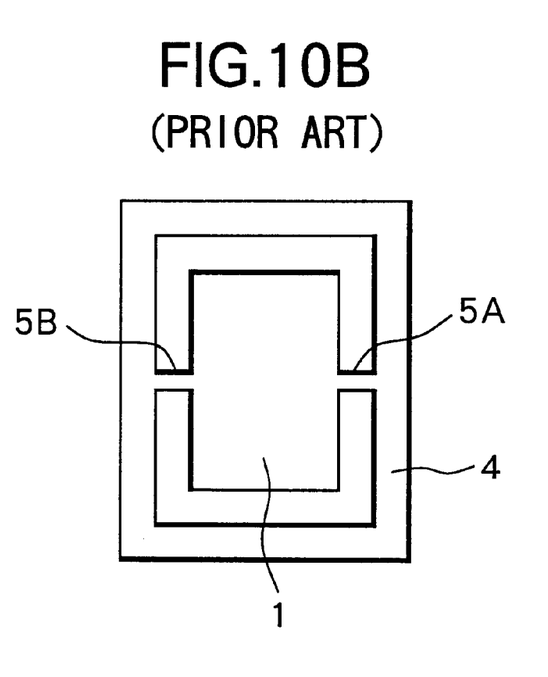
FIG. 10(B) shows the rear face side of the optical scanning apparatus in FIG. 10(A).

However, with conventional planar type optical scanning apparatus, when mounting on a package substrate for mounting, to make it easy to wire the drive coil and external electrodes, a mirror 2 and a drive coil 3 are formed on the same face (surface side) of the movable portion 1 shown in FIG. 10(A) so that the drive coil electrode terminals are positioned on the surface side of the semiconductor substrate. In this case, if the mirror 2 and the drive coil 3 are stacked, the surface becomes uneven, and hence the light reflection characteristics become irregular. Therefore the drive coil 3 is arranged around the mirror 2 shown in the figure so that the mirror 2 and the drive coil 3 do not overlap. As a result, the movable portion 1 requires not only a mirror formation area but also a drive coil formation area, and there is a limit to miniaturization of the movable portion. FIG. 10(B) shows the rear surface side of the optical scanning apparatus. In the figures, 4 denotes the semiconductor substrate, 5A and 5B denote axial support portions of a torsion bar structure for axially supporting the movable portion 1 so as to swing relative to the semiconductor substrate 4, and 6 denotes the electrode terminal of the drive coil 3.

As a planar type optical scanning apparatus, in addition to the aforementioned conventional technique, there are those disclosed for example in Japanese Unexamined Patent Publication Nos. 60-107017, 4-211218, and U.S. Pat. No. 4,421,381. However, with all of these, the mirror and the drive coil are provided on the same face side.

The present invention takes into consideration the above situation with the object of providing a planar type optical scanning apparatus that, by arranging the mirror on one face of the movable portion and the drive coil on the other face, enables further miniaturization, and in turn can achieve cost reduction.

DISCLOSURE OF THE INVENTION

Accordingly, with a planar type optical scanning apparatus of a first aspect of the present invention, a movable portion and an axial support portion for axially supporting the movable portion so as to be able to swing, are integrally formed on a semiconductor substrate, a mirror is provided on the surface side of the movable portion, a drive coil is provided on the rear face side of the movable portion, and there is provided a magnetic field generation device for applying a static magnetic field to the drive coil, the construction being such that the movable portion is driven by a magnetic force generated by passing a current through the drive coil.

With such a construction, since the mirror and the drive coil are formed on the surface side of the movable portion and the rear face side of the movable portion respectively, compared with conventional apparatus, an optical scanning apparatus having the same mirror area can be miniaturized by the size of the formation area of the drive coil.

With a mounting structure of a second aspect of the present invention for mounting the planar type optical scanning apparatus of the present invention on a mounting substrate, a cavity for allowing swinging movement of the movable portion of the optical scanning apparatus, and a conductive pattern are provided in an optical scanning apparatus fixing region of the mounting substrate, the construction being such that when the optical scanning apparatus is fitted in the fixing region, a drive coil electrode terminal provided on the rear face of the semiconductor substrate of the optical scanning apparatus, and the conductive pattern make contact.

With such a construction, when the optical scanning apparatus is fitted on the mounting substrate, since the drive coil electrode terminals of the optical scanning apparatus side can be electrically connected to terminal pins of the mounting substrate via the conductive patterns, even if the drive coil is formed on the rear face side, the optical scanning apparatus can be easily mounted on the mounting substrate.

In a third aspect, the construction of the mounting substrate is such that terminal pins for feeding out electrodes that are electrically connected to the conductive pattern are fixed at the periphery of the fixing region. Hence it is possible to connect to the outside by the terminal pins using a one-touch operation.

In a fourth aspect, the construction is such that solder surfaces are formed on the conductive pattern and the drive coil electrode terminal, respectively, and the two solder surfaces are thermo compression bonded to fix the optical scanning apparatus to the fixing region of the mounting substrate. Hence it is possible to secure the optical scanning apparatus and connect the electrode terminals at the same time.

With a mounting structure of a fifth aspect of the present invention for mounting the planar type optical scanning apparatus of the present invention on a mounting substrate, the structure has an auxiliary substrate provided with a cavity for allowing swinging movement of a movable portion of the optical scanning apparatus, and a conductive pattern at least at the periphery of the cavity of the rear face side, the construction being such that the optical scanning apparatus is fixed on the rear face of the auxiliary substrate from the surface side, and drive coil electrode terminals provided on the rear face of the optical scanning apparatus and the conductive pattern of the auxiliary substrate are electrically connected, while, above the mounting substrate on which a plurality of terminal pins are fitted through to the surface side thereof, the auxiliary substrate is fixed at a distance, with an intervening spacer, so that the protruding ends of the terminal pins on the surface side of the mounting substrate and the conductive pattern are electrically connected.

With such a construction, there is no need to form a cavity for allowing swinging movement of the movable portion of the optical scanning apparatus on the mounting substrate. Therefore it is possible to increase the strength of the mounting substrate.

Furthermore, in a sixth aspect, the construction may be such that the auxiliary substrate has a plurality of through holes in the periphery of the cavity, and has the conductive pattern for electrically connecting the surface side and the rear face side via the through holes, and the protruding ends of the terminal pins on the surface side of the mounting substrate are passed through the through holes of the auxiliary substrate to solder the terminal pins protruding from the surface side of the auxiliary substrate.

BEST MODE FOR CARRYING OUT THE INVENTION

Hereunder is a description of an optical scanning apparatus according to the present invention with reference to the appended drawings.

Figure 1:
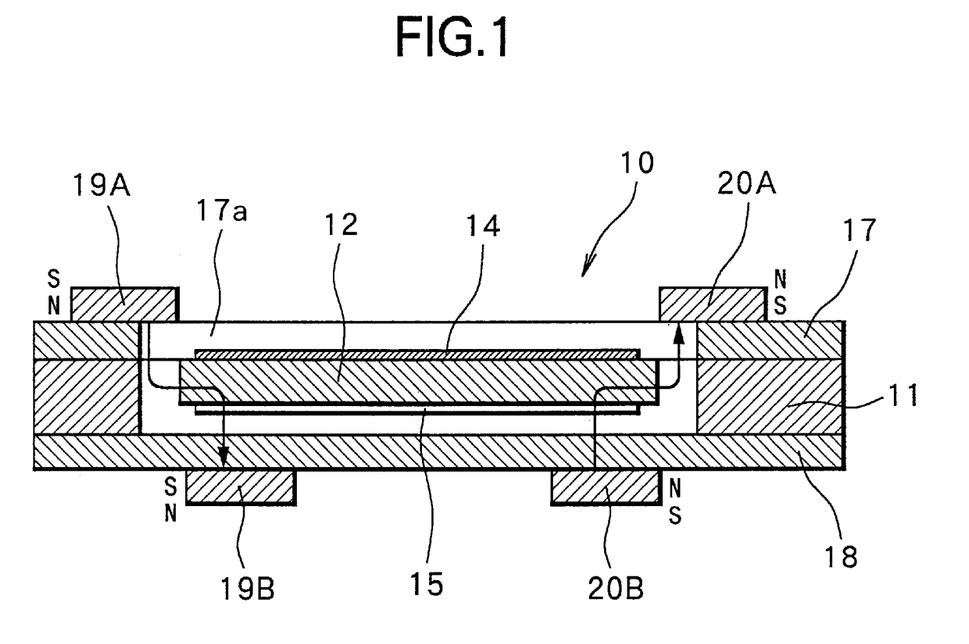
FIG. 1 is a schematic diagram showing an embodiment of an optical scanning apparatus according to the present invention.
Figure 2A:
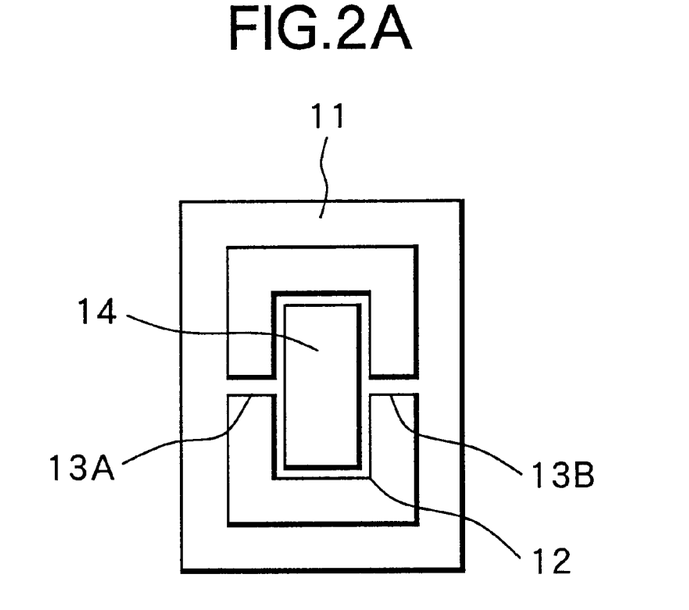
FIG. 2(A) shows the surface side of the optical scanning apparatus of the embodiment.
Figure 2B:
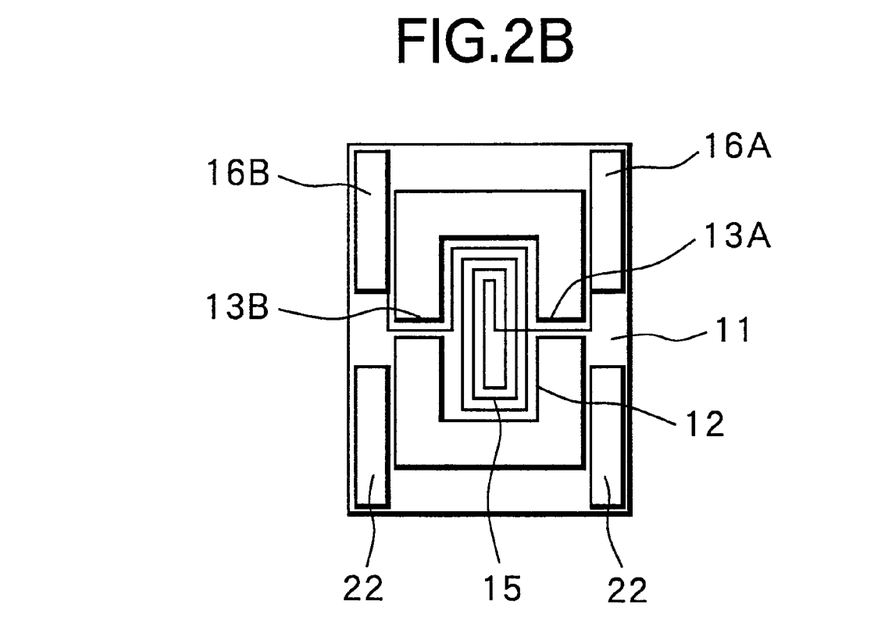
FIG. 2(B) shows the rear face side of the optical scanning apparatus in FIG. 2(A).

FIG. 1 and FIG. 2 show the construction of an embodiment of the optical scanning apparatus according to the present invention.

In FIG. 1 and FIG. 2, an optical scanning apparatus 10 has a planar movable plate 12 being a movable portion and torsion bars 13A, 13B serving as axial support portions for axially supporting the movable plate 12 to a silicon substrate 11 serving as a semiconductor substrate, integrally formed by anisotropic etching on, for example, the silicon substrate 11. Here, the thickness of the movable plate 12 is made thin compared with the thickness of the silicon substrate 11, so that the movable plate 12 can swing about the axial support portion.

On the surface side of the movable plate 12, as shown in FIG. 2(A), is a mirror 14 formed, for example, by aluminum vapor deposition. On the rear face side of the movable plate 12, as shown in FIG. 2(B), is a drive coil 15 of copper thin film, formed, for example, using an electrotyping method or the like. Furthermore, on the rear face side of the silicon substrate 11, a pair of electrode terminals 16A, 16B are formed similarly to the drive coil 15, by an electrotyping method or the like. One end of the drive coil 15 is electrically connected to one of the electrode terminals 16A by way of one of the torsion bars 13A, and the other end of the drive coil 15 is electrically connected to the other electrode terminal 16B by way of the other torsion bar 13B. Here, a plurality of solder surfaces 22 for fixing the optical scanning apparatus 10 onto a package substrate in a mounting structure (to be described later) is provided on the rear face side of the silicon substrate 11.

Insulation plates 17, 18 are fixed onto the surface and rear face of the silicon substrate 11. On the surface side insulation plate 17, an open portion 17a is provided so that the movable plate 12 can swing about the axial support portion. The insulation plates 17, 18 are provided with permanent magnets 19A, 19B and 20A, 20B serving as pairs of magnetic field generation devices for applying static magnetic fields to the drive coil 15 part, on opposite sides of the movable plate 12 parallel to the axis of the torsion bars 13A, 13B. As shown in the figure, one pair of the permanent magnets 19A, 19B is arranged such that the bottom side thereof is the north pole, and the upper side the south pole, and the other pair of permanent magnets 20A, 20B is arranged such that the bottom side thereof is the south pole, and the upper side the north pole.

With the optical scanning apparatus 10 of this construction, since the mirror 14 is formed on the surface side of the movable plate 12, and the drive coil 15 is formed on the rear face side of the movable plate 12, in comparison with the case where the mirror and the drive coil are formed on only the surface side of the movable plate as in the conventional apparatus shown in FIG. 10, if the area of the mirror 14 is the same, the area of the movable plate 12 can be reduced by the formation area of the conventional drive coil, thus enabling miniaturization of the optical scanning apparatus 10.

Accordingly, the number of chips produced on one wafer is increased. In the case where a large number of chips are produced by batch processing of semiconductor wafers, the cost for one wafer is the same wherever the same process is used. Therefore, by increasing the number of chips that can be produced on one wafer, the cost can be reduced accordingly, thus enabling reduction of manufacturing costs as well as miniaturization of the optical scanning apparatus 10.

Figure 3A:
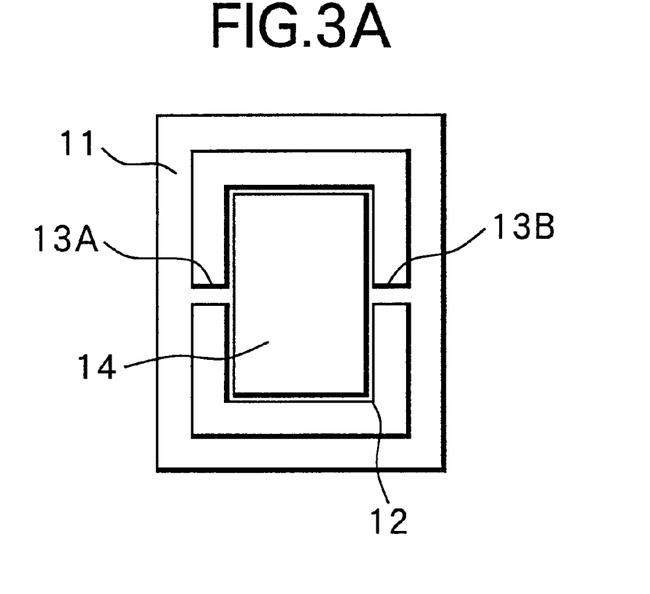
FIG. 3(A) shows the surface side when the movable portion of the optical scanning apparatus of the embodiment is the same size as in a conventional apparatus.
Figure 3B:
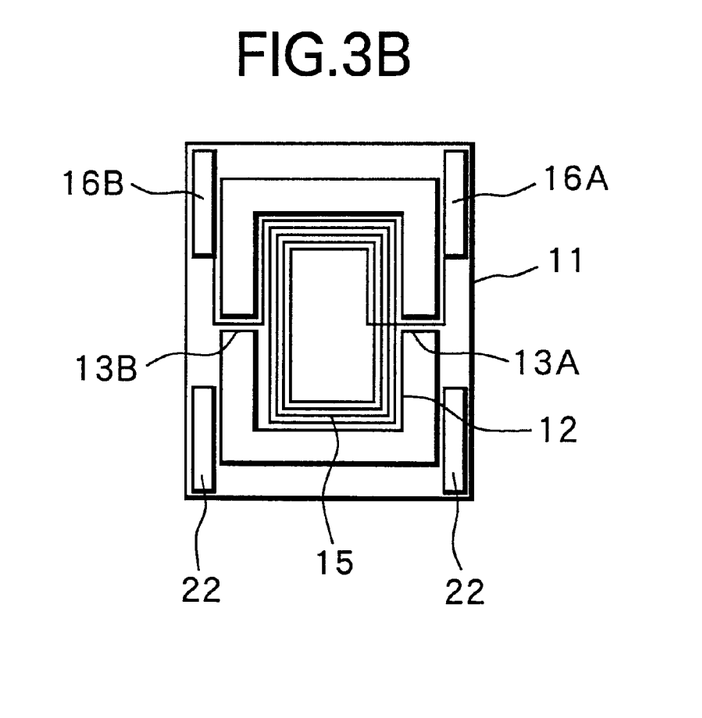
FIG. 3(B) shows the rear face side of the optical scanning apparatus in FIG. 3(A).

Furthermore, as shown in FIG. 3, if the area of the movable plate 12 is the same as in the conventional apparatus, the area of the mirror 1 can be enlarged so that there is an advantage in that a larger mirror can be produced at the same cost as a conventional one.

The operation of the optical scanning apparatus with this construction is the same as the conventional apparatus. Hereunder is a brief description.

For example, a current is passed through the drive coil 15 with one electrode terminal 16A as a positive pole and the other electrode terminal 16B as a negative pole. A magnetic field is formed by means of the permanent magnets 19A, 19B and 20A, 20B on opposite sides of the movable plate 12, in a direction so as to intersect the drive coil 15 lying along the planar face of the movable plate 12, as shown by arrows in FIG. 1. When a current flows in the drive coil 15 positioned in this magnetic field, a magnetic force acts on the opposite sides of the movable plate 12 based on the aforementioned equation (1), in a direction according to Fleming's left hand rule, and the movable plate 12 rotates. The torsion bars 13A, 13B are twisted with the rotation of the movable portion, producing a spring reaction force in the torsion bars 13A, 13B. The movable plate 12 rotates to a position where this spring reaction force and the magnetic force are in equilibrium. The angle of rotation of the movable plate 12 is proportional to the current flowing in the drive coil 15. Therefore, by controlling the current amount in the drive coil 15, the rotation angle of the movable plate 12 can be controlled. For example, the direction of reflection of a laser beam incident on the mirror 14 in a plane perpendicular to the axis of the torsion bars 13A, 13B, can be freely controlled. Hence laser scanning is possible by continuous cyclical operation of the rotation angle of the mirror 14.

Next is a description of an embodiment of the mounting structure of the second aspect of the present invention, which is suitable for package mounting of the abovementioned optical scanning apparatus 10.

Figure 4:
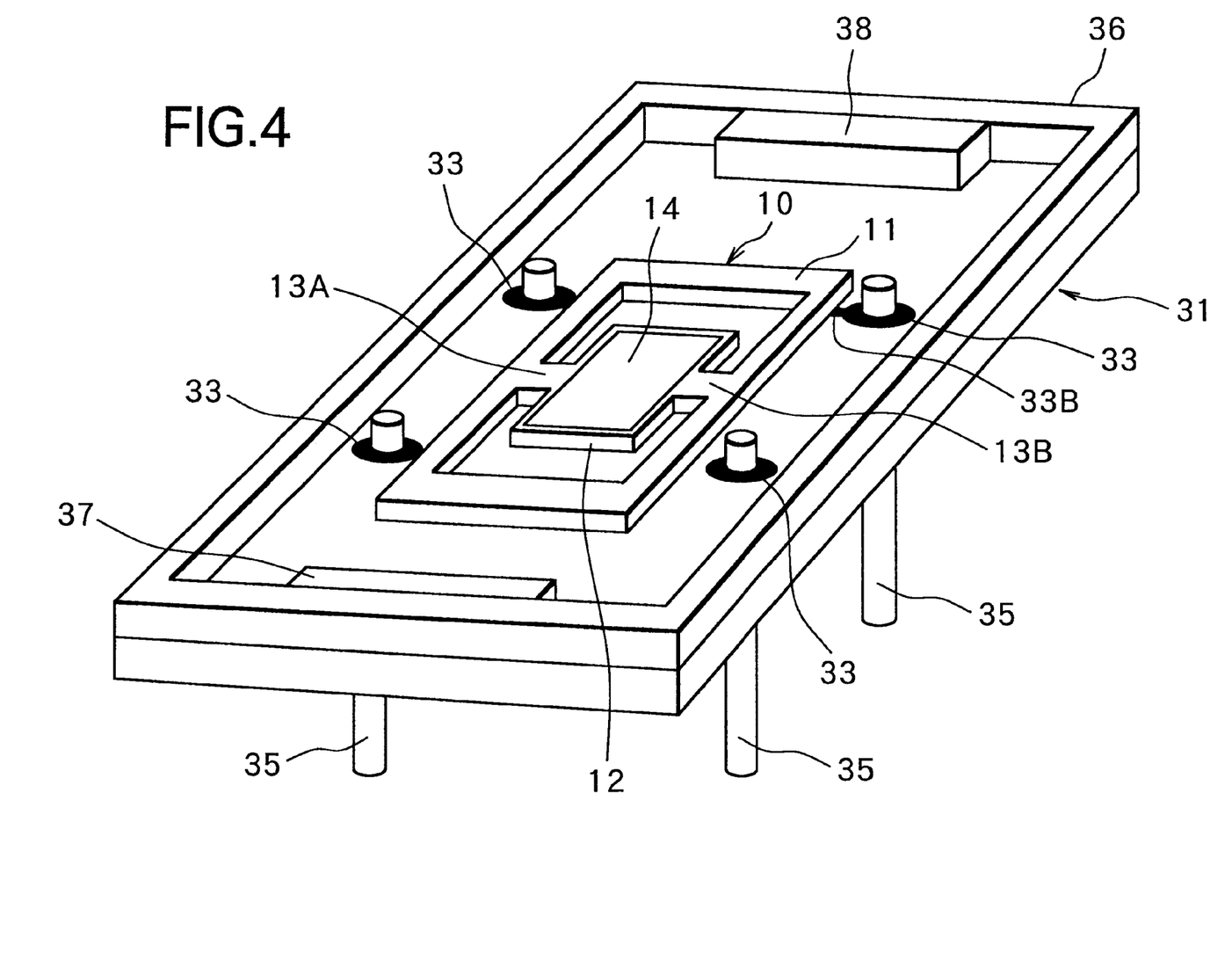
FIG. 4 shows an embodiment of a mounting structure according to the present invention.
Figure 5:
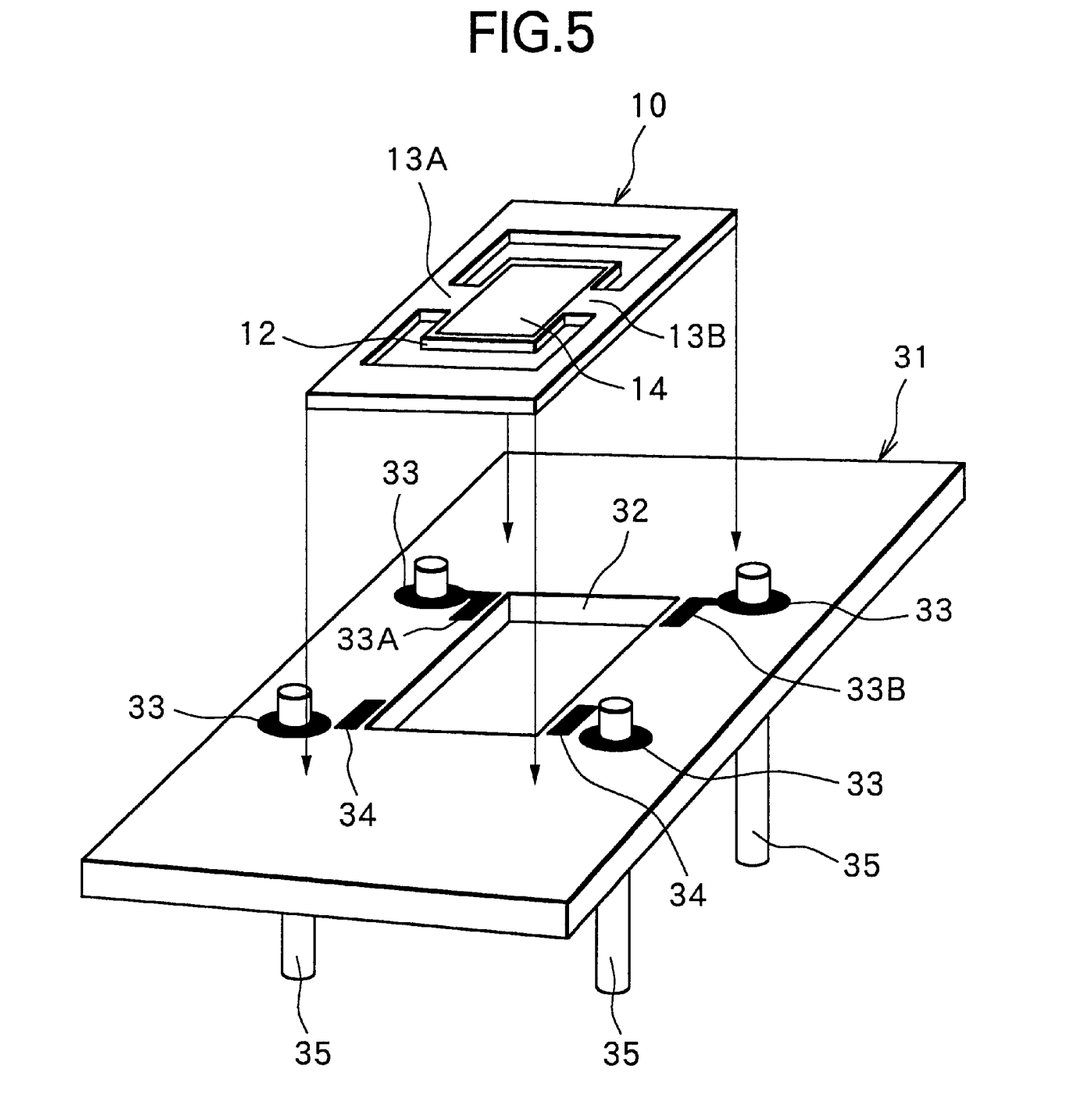
FIG. 5 is a diagram for explaining a mounting process of the mounting structure in FIG. 4.

In FIG. 4 and FIG. 5, a package substrate 31 serving as a mounting substrate, on which the optical scanning apparatus 10 is mounted is provided with a cavity 32 for allowing swinging movement of the movable plate 12 of the optical scanning apparatus 10, as shown in FIG. 5, in the fixed area of the optical scanning apparatus, positioned almost centrally on the substrate. At the periphery of the cavity 32, a pair of conductive patterns 33 which are electrically connected to the electrode terminals 16A, 16B on the rear face of the optical scanning apparatus 10, and other conductive patterns 33, and solder faces 34 serving as fixing parts for fitting the optical scanning apparatus 10 are provided. Solder faces are also formed on extensions 33A, 33B of the conductive patterns 33, to serve as complementary fixing parts to the solder faces 34. Moreover, in the package substrate 31, two terminal pins 35 which electrically connect to the conductive patterns 33, and other two terminal pins 35 are provided, such that the pins pass through and protrude from the surface side of the substrate 31 via through holes.

A frame-like yoke 36 made, for example, from a magnetic material such as pure iron, is provided on an upper peripheral face of the package substrate 31. A pair of permanent magnets 37, 38 serving as static magnetic field generating devices, are provided on the inside of two mutually facing sides of the yoke 36. With the permanent magnets 37, 38 the south and north poles face each other so that a static magnetic field is produced from one permanent magnet 37 (or 38) towards the other permanent magnet 38 (or 37), intersecting the optical scanning apparatus 10. Here, with this embodiment, the permanent magnets 37 and 38 are arranged with the optical scanning apparatus 10 between them. However, the arrangement of the permanent magnets is not limited to the construction of this embodiment, and the arrangement may be above and below as shown in FIG. 1.

The process of mounting the optical scanning apparatus 10 on the package substrate 31 is such that, as shown by the arrows in FIG. 5, the optical scanning apparatus 10 is mounted on the fixed area located almost in the center of the surface of the package substrate 31 from above. When mounting, the mounting is such that solder faces formed on the electrode terminals 16A, 16B of the drive coil on the rear face of the optical scanning apparatus 10 make contact with the solder faces of the extensions 33A, 33B of the conductive patterns 33, and the solder faces 22 on the rear face of the optical scanning apparatus 10 contact the solder faces 34, 34 on the package substrate 31 side. Thereafter, a thermo compression bonding process is applied, so that the solder faces contacting each other are bonded, to fix the optical scanning apparatus 10 onto the package substrate 31. Thus, as shown in FIG. 4, the optical scanning apparatus 10 is mounted on the package substrate 31.

With this mounting structure, when the optical scanning apparatus 10 is fixed onto the package substrate 31, at the same time the electrode terminals 16A, 16B on the optical scanning apparatus 10 side can be electrically connected to the extensions 33A, 33B of the conductive patterns 33 on the package substrate 31 side. Therefore, even in the case where the drive coil 15 is provided on the rear face side of the movable plate 12, the electrode terminals 16A, 16B of the drive coil 15 can be electrically connected to the terminal pins 35 of the package substrate 31 so that the electrodes can be easily fed to the outside. Since swinging movement of the movable plate 12 can be allowed by the cavity 32 of the package substrate 31, there is no impediment to the operation of the optical scanning apparatus 10.

Here, the fixing method of the optical scanning apparatus 10 is not limited to the embodiment. A construction without terminal pins may be used.

With the mounting structure in FIG. 4, the optical scanning apparatus 10 can also be easily mounted even though the drive coil 15 is provided on the rear face of the movable plate 12. However, it is necessary to provide the cavity 32 for enabling swinging movement of the movable plate 12, in the package substrate 31. Therefore, there is a concern that the strength of the package substrate 31 may be reduced.

Figure 6:
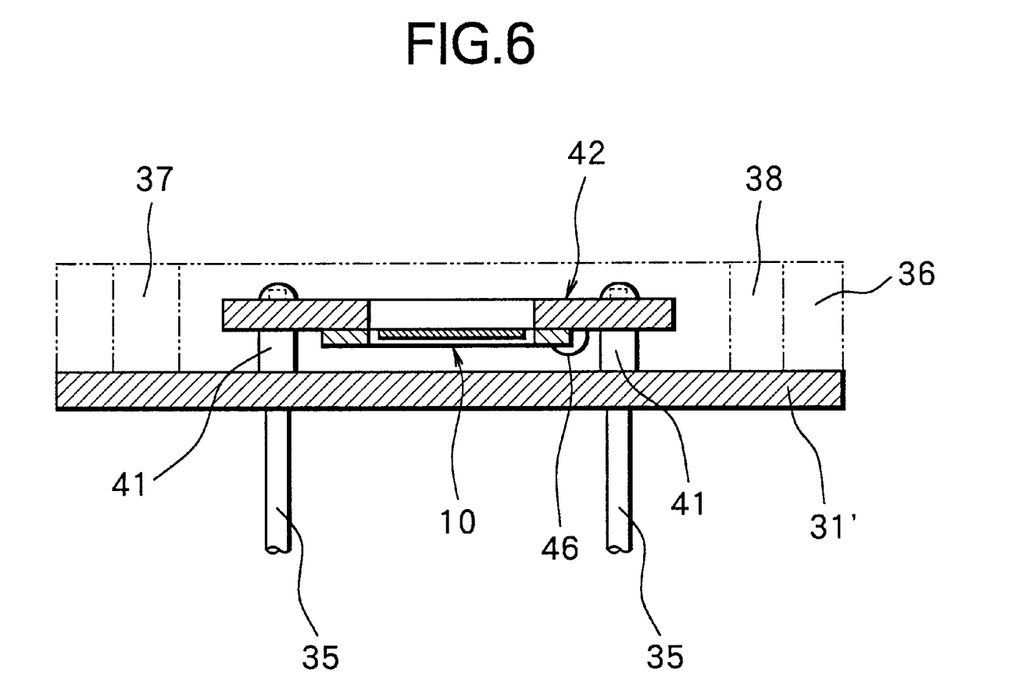
FIG. 6 shows an embodiment of the mounting structure according to the present invention.

FIG. 6 shows the mounting structure of a fifth aspect of the present invention, in which an optical scanning apparatus provided with only a drive coil on the rear face of a movable plate can be easily mounted on a package substrate, without reducing the strength of the package substrate. Here, the same elements as in FIG. 4 are represented by the same symbols, and the descriptions are omitted.

In FIG. 6, with the mounting structure of the embodiment, the construction is such that an auxiliary substrate 42 is fixed to a package substrate 31' at a distance from a package substrate 31', by interposing spacers 41, and the optical scanning apparatus 10 is fixed onto the rear face of the auxiliary substrate 42, that is, between the package substrate 31" and the auxiliary substrate 42. Here, similarly to the embodiment of FIG. 4, the permanent magnets 37, 38 and the frame-like yoke 36 are provided on the surface of the package substrate 31".

Figure 7:
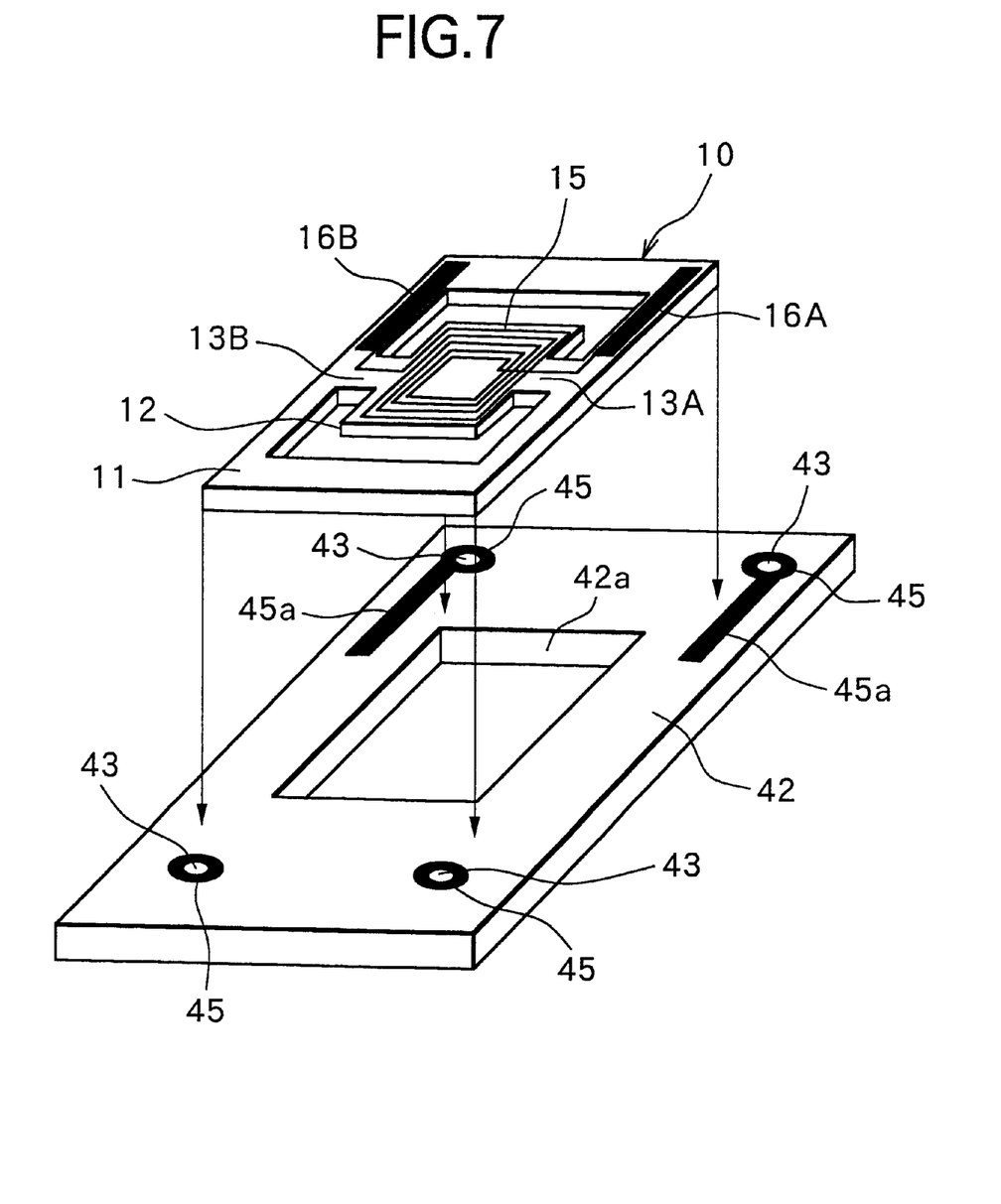
FIG. 7 is a diagram for explaining the mounting process of the mounting structure in FIG. 6.
Figure 8:
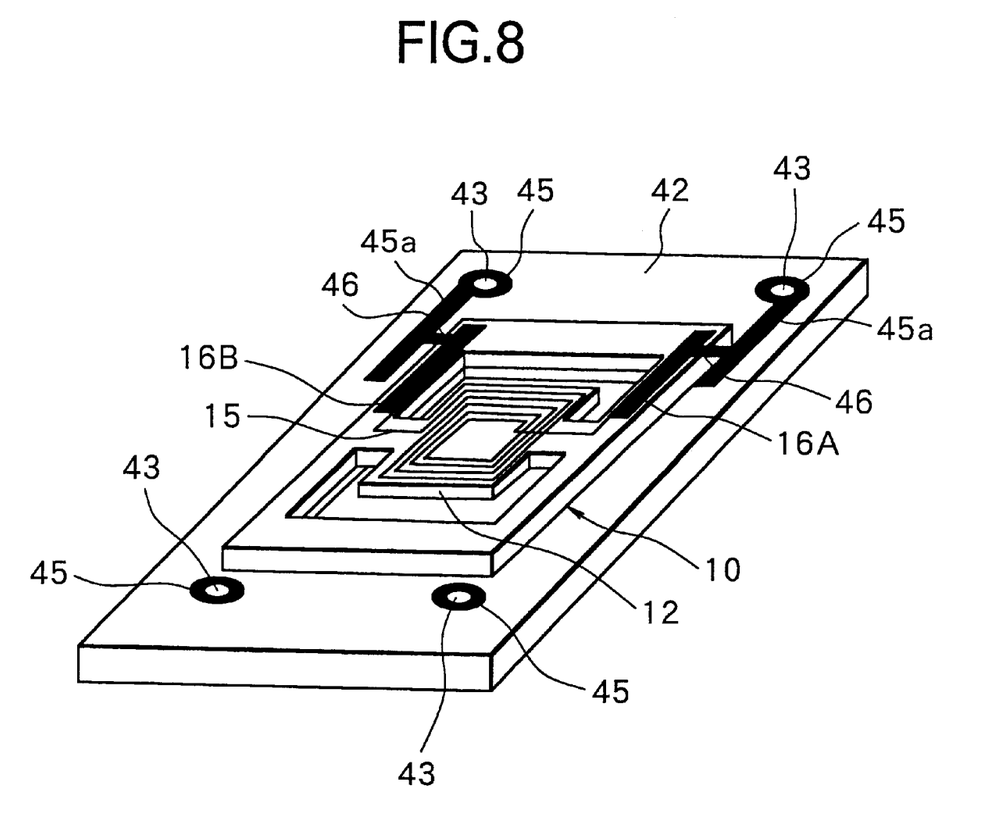
FIG. 8 is diagram for explaining the mounting process continued from FIG. 7.
Figure 9:
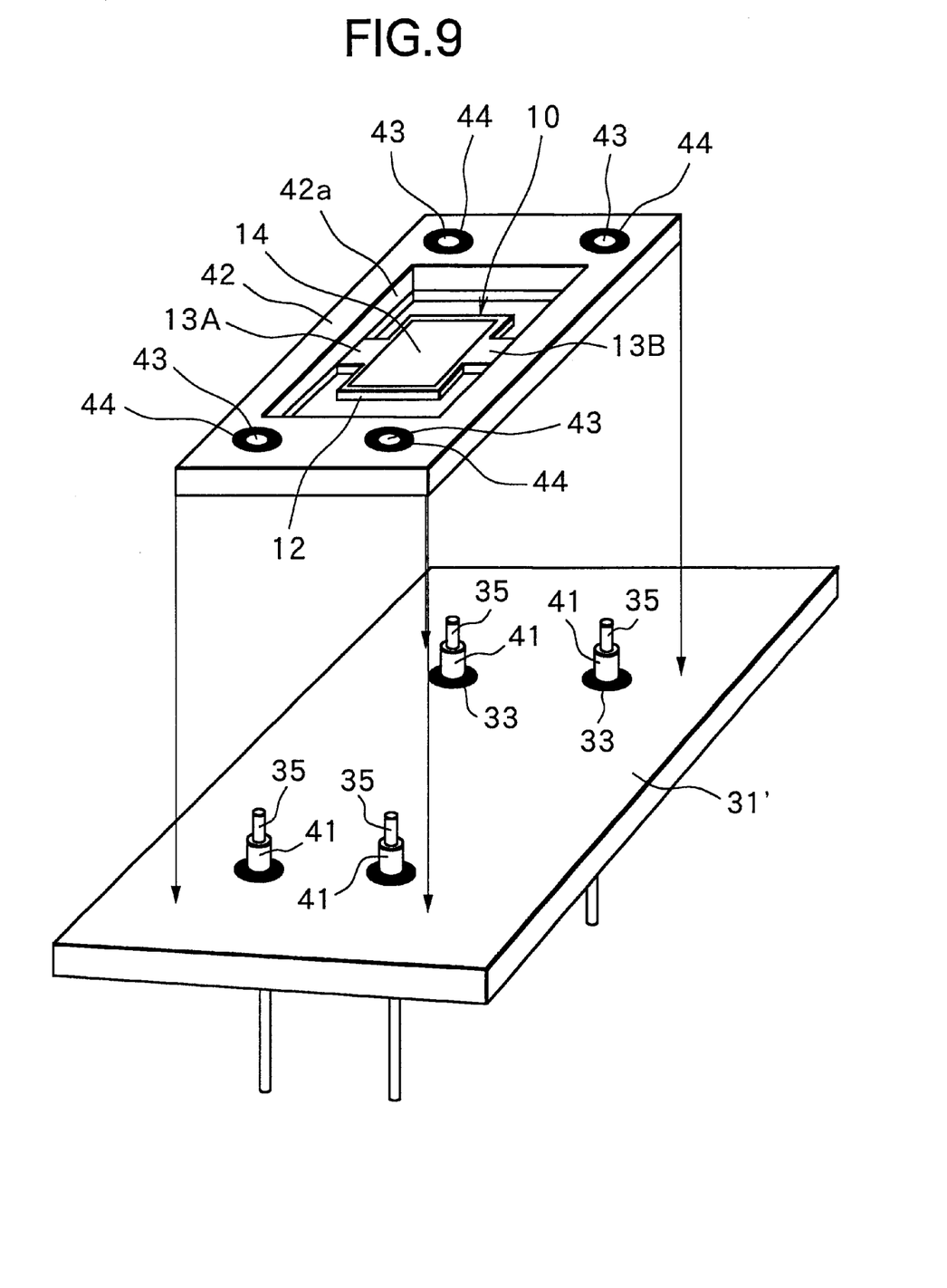
FIG. 9 is a m for explaining the mounting process continued from FIG. 8.

The auxiliary substrate 42, as shown in FIG. 7 through FIG. 9, has a cavity 42a for allowing swinging movement of the movable plate 12 of the optical scanning apparatus 10, and the through holes 43 in four points at the periphery of the cavity 42a. Furthermore, conductive patterns 44, 45, electrically conducting via the through holes 43, are provided on the surface and rear face of the auxiliary substrate 42. The conductive patterns 45 on the rear face side have extensions 45a, for connecting to the drive coil electrode terminals 16A, 16B on the optical scanning apparatus 10.

The package substrate 31" is formed similarly to the package substrate 31 of the embodiment of FIG. 4 except that it has no cavity.

A mounting process of the optical scanning apparatus 10 of the embodiment is described based on FIG. 7 through FIG. 9.

With the rear face side of the auxiliary substrate 42 facing upward, the optical scanning apparatus 10 is fitted onto the fixed area positioned approximately centrally on the auxiliary substrate 42 from above as shown by the arrows in FIG. 7, in a condition with the rear face side of the optical scanning apparatus 10 facing upward. After fixing, the electrode terminals 16A, 16B on the optical scanning apparatus 10 side, and the extensions 45a, 45a of the conductive patterns 45 on the rear face side of the auxiliary substrate 42 are electrically connected by bonding wires 46. The situation is shown in FIG. 8.

Next, from the condition of FIG. 8, the auxiliary substrate 42 is reversed so that the surface side of the auxiliary substrate 42 faces upward. In this manner, as in FIG. 9, the face of the mirror 14 of the optical scanning apparatus 10 faces upward. In this condition, the spacers 41 and the auxiliary substrate 42 are installed sequentially to each protruding end of terminal pins 35 of the package substrate 31" to fix the auxiliary substrate 42 on the package substrate 31". Thereafter, the terminal pins 35 protruding from the surface side of the auxiliary substrate 42 are soldered to fix the auxiliary substrate 42 to the package substrate 31". As a result, the electrode terminals 16A, 16B of the drive coil 15 of the optical scanning apparatus 10 are electrically connected to the terminal pins 35 via the conductive patterns 43, 44 and the solder fixing.

With the mounting structure described above, even in the case where the drive coil 15 is provided on the rear face side of the movable plate 12, the electrode terminals 16A, 16B of the drive coil 15 can be electrically connected to the terminal pins 35 of the package substrate 31', and the electrodes can be easily fed to the outside. Moreover, since the package substrate 31" has no cavity, the strength of the package substrate 31" is improved in comparison with the mounting structure in FIG. 4.

With the optical scanning apparatus of the present invention described above, the area of the movable portion can be reduced so that the optical scanning apparatus can be miniaturized. Consequently, since the number of chips produced on one wafer is increased, the cost can be reduced accordingly, thus enabling reduction of manufacturing costs. Furthermore, if the area of the movable portion is the same as a conventional apparatus, the area of the mirror can be enlarged so that there is an advantage in that a larger mirror can be produced at the same cost as a conventional one.

Moreover, with the mounting structure of the present invention, when the optical scanning apparatus is fixed on the mounting substrate, at the same time the electrode terminals on the optical scanning apparatus side can be electrically connected to the terminal pins on the mounting substrate side. Therefore, even in the case where the drive coil is provided on the rear face side of the movable portion, the electrodes of the optical scanning apparatus can easily be fed outside. In this case, if the solder faces are formed on the conductive patterns on the substrate side, and the electrode terminals of the drive coil on the optical scanning apparatus side respectively, the conductive patterns can also serve as part of the fixed area, and fitting of the optical scanning apparatus and connection of the electrode terminals are possible at the same time.

Moreover, with a mounting structure in which an auxiliary substrate is fitted above the mounting substrate via spacers, and a cavity is formed in the auxiliary substrate to fix the optical scanning apparatus, even in the case where the drive coil is provided on the rear side of the moveable portion, it is possible to feed out the electrodes of the optical scanning apparatus easily. Furthermore, a cavity for allowing swinging movement of the moveable portion of the optical scanning apparatus does not need to be formed in the mounting subtrate, and hence the strength of the mounting substrate can be improved.

INDUSTRIAL APPLICABILITY

The present invention enables miniaturization and cost reduction of a planar type optical scanning apparatus that is manufactured using semiconductor manufacturing technology, and hence miniaturization and cost reduction of various apparatus which incorporate this planer type optical scanning apparatus can be realized. Therfore the industrial applicability is considerable.

What is claimed is:

1. A mounting structure for mounting a planar type optical scanning apparatus on a mounting substrate, said planar type optical scanning apparatus comprising a movable portion having a front surface and a rear surface, an axial support portion for axially supporting said movable portion such that said movable portion is capable of swinging, said axial support portion and said movable portion being integrally formed on a semiconductor substrate, a mirror provided on the front surface of said movable portion, a drive coil provided on the rear surface of said movable portion, and a magnetic field generation device for applying a static magnetic field to said drive coil, said mounting structure comprising:

a cavity for allowing swinging movement of the movable portion of the optical scanning apparatus; and a conductive pattern provided in an optical scanning apparatus fixing region of said mounting substrate, such that, when said optical scanning apparatus is fitted in said fixing region, a drive coil electrode terminal provided on the rear surface of the semiconductor substrate of the optical scanning apparatus makes contact with said conductive pattern.

2. A mounting structure for a planar type optical scanning apparatus according to claim 1, wherein said mounting substrate fixes terminal pins for feeding out electrodes that are electrically connected to said conductive pattern at the periphery of said fixing region.

3. A mounting structure for a planar type optical scanning apparatus according to either one of claim 1 or claim 2, wherein solder surfaces are formed on said conductive pattern and said drive coil electrode terminal, respectively, and the two solder surfaces are thermo compression bonded to fix the optical scanning apparatus to the fixing region of said mounting substrate.

4. A mounting structure for mounting a planar type optical scanning apparatus on a mounting substrate, said planar type optical scanning apparatus comprising a movable portion having a front surface and a rear surface, an axial support portion for axially supporting said movable portion such that said movable portion is capable of swinging, said axial support portion and said movable portion being integrally formed on a semiconductor substrate, a mirror provided on the front surface of said movable portion, a drive coil provided on the rear surface of said movable portion, and a magnetic field generation device for applying a static magnetic field to said drive coil, said mounting structure comprising:

an auxiliary substrate provided with a cavity allowing swinging movement of a movable portion of the optical scanning apparatus; and a conductive pattern at least at the periphery of said cavity of the rear surface, and wherein said optical scanning apparatus is fixed on the rear surface of said auxiliary substrate from the front surface, and drive coil electrode terminals provided on the rear surface of the optical scanning apparatus and the conductive pattern of said auxiliary substrate are electrically connected, while, above said mounting substrate on which a plurality of terminal pins are fitted through to the front surface thereof, said auxiliary substrate is fixed at a distance, with an intervening spacer, so that the protruding ends of the terminal pins on the front surface of said mounting substrate and the conductive pattern of said auxiliary substrate are electrically connected.

5. A mounting structure for a planar type optical scanning apparatus according to claim 4, wherein said auxiliary substrate has a plurality of through holes in the periphery of said cavity and said conductive pattern for electrically connecting the surface side and the rear face side via said through holes, and the protruding ends of the terminal pins on the surface side of said mounting substrate are passed through the through holes of said auxiliary substrate to solder the terminal pins protruding from the surface side of said auxiliary substrate.

* * * * *